United States Patent
Fischer et al.

(10) Patent No.: US 7,267,207 B2
(45) Date of Patent: Sep. 11, 2007

(54) PNEUMATICALLY OR ELECTROMOTIVELY OPERABLE DISC BRAKE

(75) Inventors: Rudolf Fischer, Erding (DE); Dietmar Knoop, Ebenhausen (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/282,761

(22) Filed: Nov. 21, 2005

(65) Prior Publication Data

US 2006/0118365 A1 Jun. 8, 2006

Related U.S. Application Data

(63) Continuation of application No. PCT/EP2004/005327, filed on May 18, 2004.

(30) Foreign Application Priority Data

May 19, 2003 (DE) ............... 103 22 833
Jul. 7, 2003 (DE) ............... 103 30 633

(51) Int. Cl.
*F16D 65/00* (2006.01)
(52) U.S. Cl. .............. 188/73.1; 188/72.1; 188/72.9
(58) Field of Classification Search .......... 188/73.1, 188/72.1, 72.2, 72.3, 72.7, 728.8, 106 A, 188/156, 158, 162, 163, 72.9, 196 R, 196 D; 310/77, 80, 93; 303/115.2
See application file for complete search history.

(56) References Cited

U.S. PATENT DOCUMENTS 2,023,674 A * 12/1935 Fawick .............. 188/72.4
3,512,497 A    5/1970 Falke

FOREIGN PATENT DOCUMENTS

| DE | 195 11 287 A1 | 1/1996 |
| DE | 195 15 063 C2 | 2/1997 |
| EP | 1 160 476 A2 | 5/2001 |

OTHER PUBLICATIONS

International Search Report dated Aug. 2, 2004.
Roloff/Matek "Maschinenelemente" pp. 632 and 633.

* cited by examiner

*Primary Examiner*—Pam Rodriguez
(74) *Attorney, Agent, or Firm*—Crowell & Moring LLP

(57) ABSTRACT

A pneumatically or electromotively operable disc brake for a commercial vehicle, including a brake caliper, which straddles a brake disc, and at least one brake application device for tensioning the disc brake. The side of the brake application device that faces the brake disc is provided with at least one pressing piece, which is sealed with regard to the brake caliper by deformable metal bellows made of a sheet metal material, which are connected to the brake caliper and to the pressing piece.

26 Claims, 9 Drawing Sheets

Fig 4
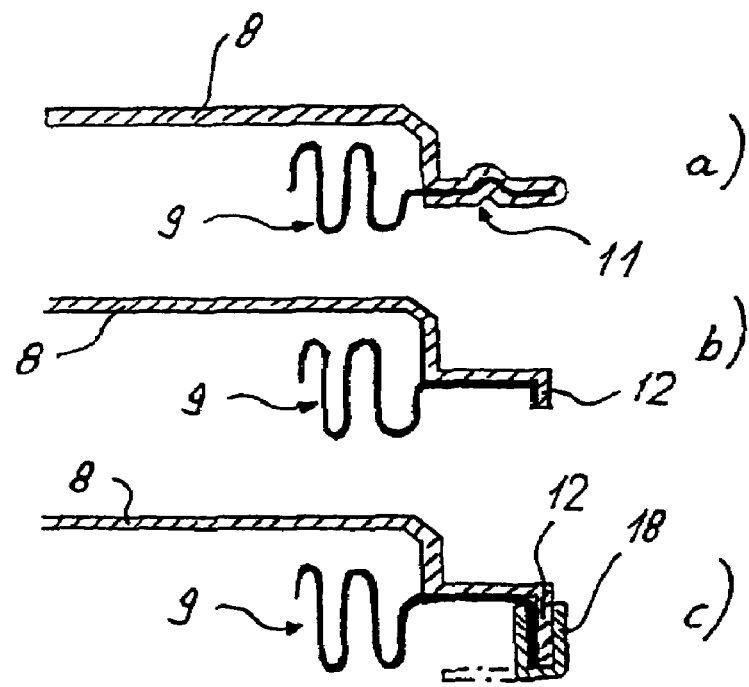
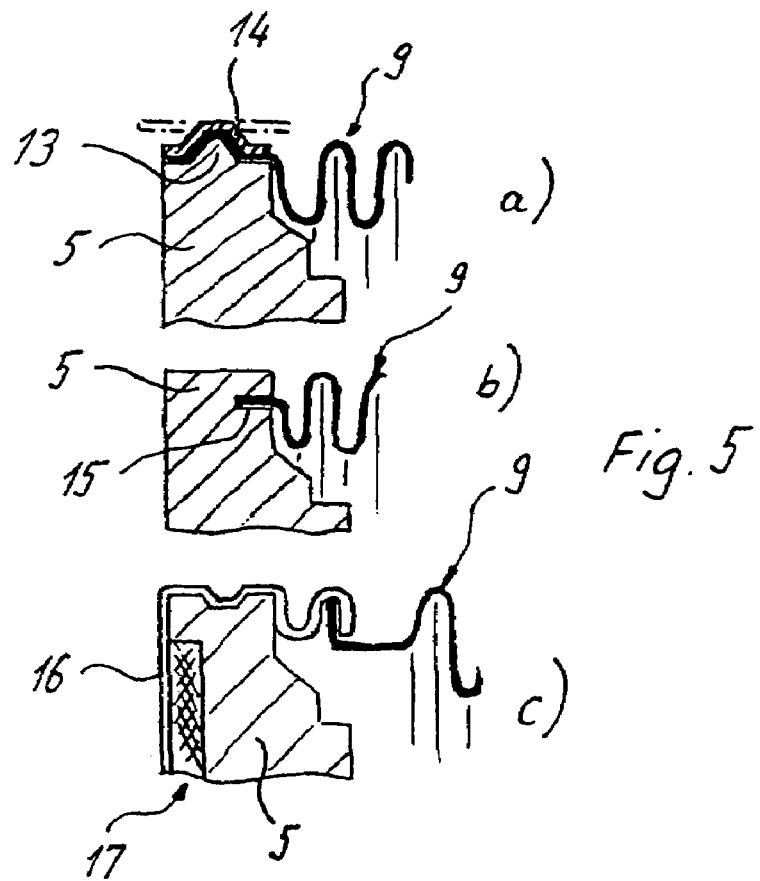
Fig. 5

PNEUMATICALLY OR ELECTROMOTIVELY OPERABLE DISC BRAKE

CROSS-REFERENCE TO RELATED APPLICATIONS

This application is a continuation of PCT Application No. PCT/EP2004/005327 filed on May 18, 2004 which claims priority to German Application Nos. 103 22 833.0 filed on May 19, 2003 and 103 30 633.1 filed Jul. 7, 2003.

BACKGROUND AND SUMMARY OF THE INVENTION

The present invention relates to a pneumatically or electromotively operable disc brake for a commercial vehicle, having a brake caliper which straddles a brake disc, and having at least one brake application device for applying the disc brake. The brake application device has at least one pressure piece on its side which faces the brake disc, which pressure piece is sealed off, with respect to the brake caliper, or a part which is connected to the brake caliper, by a deformable bellows which is preferably connected to the brake caliper, or the part connected to the caliper, and to the pressure piece.

The principle construction of a disc brake of this type is known, for example, from DE 195 15 063 C2.

Here, the brake application device has two adjusting spindles, which are mounted displaceably in the brake caliper and bear, in each case, one pressure piece at their end which faces the brake disc. The pressure pieces press against a brake lining which makes contact with the brake disc in operation. The brake linings are held in the brake carrier and have force applied to them by the pressure pieces.

In order to protect the interior of the brake caliper and the adjusting spindles against soiling, a bellows in the form of a folding bellows is fastened to the respective pressure piece, which bellows is fixed at its other end to a closure plate, by which the brake caliper is closed. To this extent, the closure plate is an integral constituent part of the brake caliper. The bellows may also act directly on the brake caliper if no closure plate is provided.

Disc brakes of the above-mentioned type, that is to say those customarily mounted in commercial vehicles, are subjected to considerable loading in operation, in particular with regard to thermal loading. The frictional heat which is generated during braking is transmitted to a significant extent to the individual components of the disc brake, in particular also to the bellows of the respective pressure piece, which bellows acts as a sealing element.

The bellows which have been used up to now consist of a plastic, preferably of silicone. However, it would be desirable to use a material which is even more suitable for the bellows, in order to extend the maintenance intervals with regard to the bellows.

It is also desirable to use material which may be subjected to greater mechanical loading and is even less sensitive to soiling and damage, as can be produced, for example, by lining abrasion and rocks, stones, sand or the like, which fly around during driving.

Although attempts have already been made to reduce or preclude the mechanical loading via a cover, which cover is pushed over the bellows, for example in the form of a helical spring made from metal, this leads to additional thermal loading of the bellows as a result of a build-up of heat, with the result that this solution is entirely unsatisfactory.

The present invention is, therefore, based on the object of developing a disc brake of the above-mentioned type, such that its service life is increased and repair costs are reduced as a result.

This object is achieved by a disc brake for commercial vehicles wherein the bellows is composed of metal.

A disc brake which is configured in this way is distinguished, in particular, by the fact that its service life is increased substantially, that is to say the repair times, after which replacement of the bellows owing to wear is required, are substantially longer than has been the case up to now. This naturally results in cost advantages, as firstly the down time of the commercial vehicle is reduced and secondly assembly and material costs are lowered.

According to one advantageous development of the invention, the bellows are configured as folding bellows, for example in the form of lamellar or fluted bellows. Here, at least one, but preferably a plurality of flutes or folds are to be realized, in order to ensure a sufficient spring action.

Although metal folding bellows are known per se, for example from general textbooks such as Roloff/Matek: "Maschinenelemente" [Machine elements], 14th edition, pages 632, 633, and although a metal folding bellows 45 is known from DE 195 11 287 A1, the metal folding bellows shown there in no way serves for sealing, as there is a further folding bellows made from an elastomer with the designation for this purpose in the application. Rather, the folding bellows made from metal serve to produce a torsionally strong connection for transmitting torsional moments from the tensile stress force emanating from the threaded adjusting spindle between the force transmission plate with projection and the threaded spindle. Here, there is no connection to the brake caliper or to a part which is connected to the brake caliper, such as a cover which closes an opening in the brake caliper. Therefore, counter to the recommendations of the manufacturers, a metal folding bellows is used in this document as an element which transfers torque and not, for instance, as a connection between a pressure piece and a brake caliper or a part which is connected to the brake caliper, for sealing off the interior of the brake caliper.

Metal folding bellows are also known from U.S. Pat. No. 3,512,497. In this document, there is also no provision in any way, however, to use the metal folding bellows as a sealing element between a brake caliper and a pressure piece.

The use of a metal folding bellows in the manner according to the invention has not been considered previously, presumably since it was thought that the torque which the metal folding bellows exerts in each case on the control spindles on account of its spring action between the pressure piece and the brake caliper stands in the way of said use, in particular as the spring action and thus the torque change continuously as the lining wear increases and the folding bellows extends increasingly. According to the idea of the invention, however, it is surprisingly entirely possible to govern this effect. To be precise, in particular if the folding bellows is designed such that the thread holding moment, which is produced by the spring force of the metallic folding bellows and which the folding bellows exerts on the control spindles, is made small such that the adjusting function of the adjusting device on the adjusting spindles remains ensured by rotation of the control spindles and is not impaired (or not impaired significantly or to a practically considerable extent). Only if this condition is fulfilled does the function of adjustment remain ensured to a sufficient extent. The spring force is preferably smaller than 1000 N, in particular smaller than 800 N. These force details relate to two folding bellows. Per folding bellows, the following preferably holds: spring force <500 N, in particular <400 N.

It is also contemplated that the folding bellows is designed in such a way that, in the event of unworn brake linings and in the event of worn brake linings, it acts as a tension spring (or as a compression spring) on the adjusting spindles.

The folding bellows is preferably manufactured from a noncorroding metal. Here, lightweight metal or, in particular, stainless steel are possible. The folding bellows is manufactured, in particular, with the use of a laser welding process.

In addition to the high thermal and mechanical loadability, a bellows of this type is distinguished by the fact that it is deformable in a fluid-tight and permanently elastic manner. The latter permits the multiple use of the bellows, that is to say it can also be used in the case of a plurality of brake lining changes, it being possible for the bellows to be deformed back into its initial state after the brake lining has been replaced.

As the shape and configuration of the novel bellows are expediently adapted to those of a known bellows, there is also the theoretical possibility of retrofitting. In the case of a necessary change, the novel bellows can therefore be used. The metal bellows as a constituent part of the original equipment may, of course, also be replaced per se by a novel metal bellows.

As a result of the adaptation of the novel bellows to the shape of the previously used bellows, it is also not necessary to change the other components of the disc brake to which the bellows can be connected. Rather, with appropriate adaptation, the bellows according to the invention may also theoretically be installed into an existing disc brake, in particular into the available installation space. It can, however, also be necessary to modify the installation conditions slightly, as the metal bellows is generally somewhat longer than a silicone bellows.

The production of the novel bellows is also very simple and inexpensive, as use may be made of known technologies, which permit economical production, above all under the aspect that bellows of this type are series-produced products, which are used in large numbers.

On account of the extension (tensile and compressive) rigidity of the bellows, the adjusting spindle, which is connected to the pressure piece, guided in the brake caliper and configured as a threaded spindle, is secured against unintended rotation as a result of vibrations and the like, with the result that, in some circumstances, a frictional securing element which has previously been required for this purpose may be omitted, at any rate in the event of a design as a pure compression spring. In some circumstances, the bellows may also be combined with a sealing ring section, at least at one of its ends.

The metal bellows may be fastened to the pressure piece by welding, soldering, roll forming, pinching, pressing with or without a press ring or by being held by means of a plate for thermal insulation which can be fixed to the pressure piece.

The connection to the brake caliper or the connected closure plate may be effected in the same way, it being possible for the closure plate to have a pot-shaped depression, to the base of which one end of the bellows is fastened, while the other end is fastened to the pressure piece.

In this case, the bellows extends coaxially with respect to the adjusting spindle which is arranged on the pressure piece.

According to a further advantageous embodiment, in the event of unworn brake linings, the bellows has an at least partially rolled up cover in its initial position, such that, as the lining wear increases, the rolled up region of the folding bellows can be extended gradually out of the rolled up region. In the event of a lining change, this "single use bellows" is then also replaced by a new one.

Further advantageous configurations of the invention are described and claimed herein.

Other objects, advantages and novel features of the present invention will become apparent from the following detailed description of the invention when considered in conjunction with the accompanying drawings.

BRIEF DESCRIPTION OF THE DRAWINGS

FIGS. 4a-4c show, in each case, different ways of fastening a bellows to the brake caliper of the disc brake;

FIGS. 5a-5c show, in each case, different ways of fastening the bellows to a pressure piece of the disc brake;

DETAILED DESCRIPTION OF THE DRAWINGS

Figure 1:
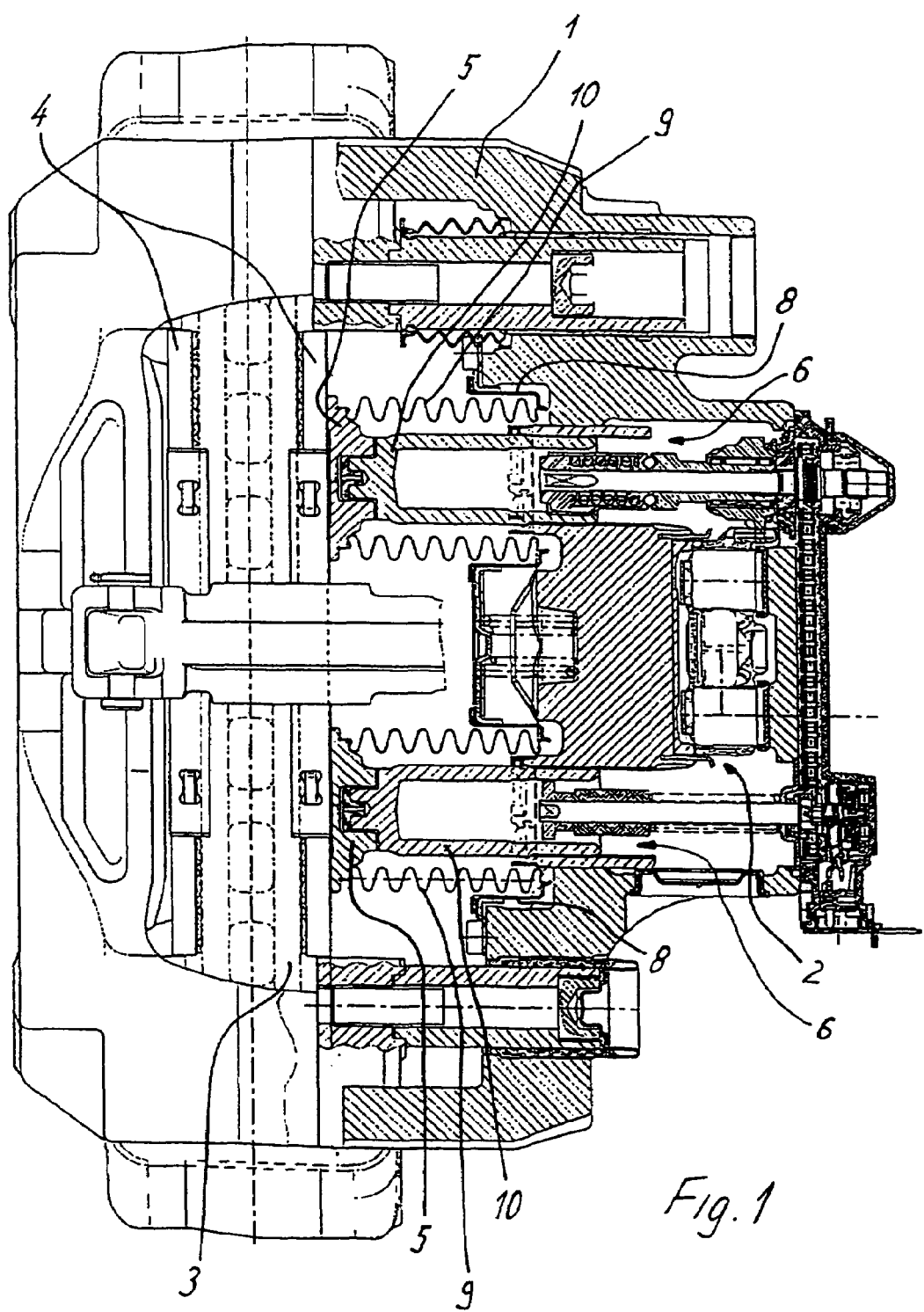
FIG. 1 shows a partially sectioned plan view of a disc brake.

FIG. 1 shows a pneumatically operable disc brake which has a brake caliper 1, configured as a sliding caliper, which straddles a brake disc 3 in its upper circumferential region. In principle, electromotive actuation of the disc brake is also possible.

A brake lining 4 is arranged on each side of the brake disc 3. One of the brake linings, 4 is fastened to, or bears against, pressure pieces 5 which are shown here on the right and with which the associated brake lining 4 can be pressed against the brake disc 3.

For this purpose, a brake application device 2 is provided, which is operated by a rotary lever and is connected to the adjusting spindles 10. The adjusting spindles 10 bear the pressure pieces 5 and are guided axially movably in the brake caliper 1.

To compensate for clearance play between the brake lining and the pressure piece, one (or both) of the adjusting spindles 10 is provided with a wear adjusting device 6, which is coupled to the rotary lever. The two control spindles 10 are synchronized here by means of a chain 22 (cf. also FIG. 6).

On its side which faces the brake disc 3, the brake caliper 1 is largely closed by a closure plate 7 (see FIG. 2) through which the adjusting spindle 10 protrudes.

Figure 2:
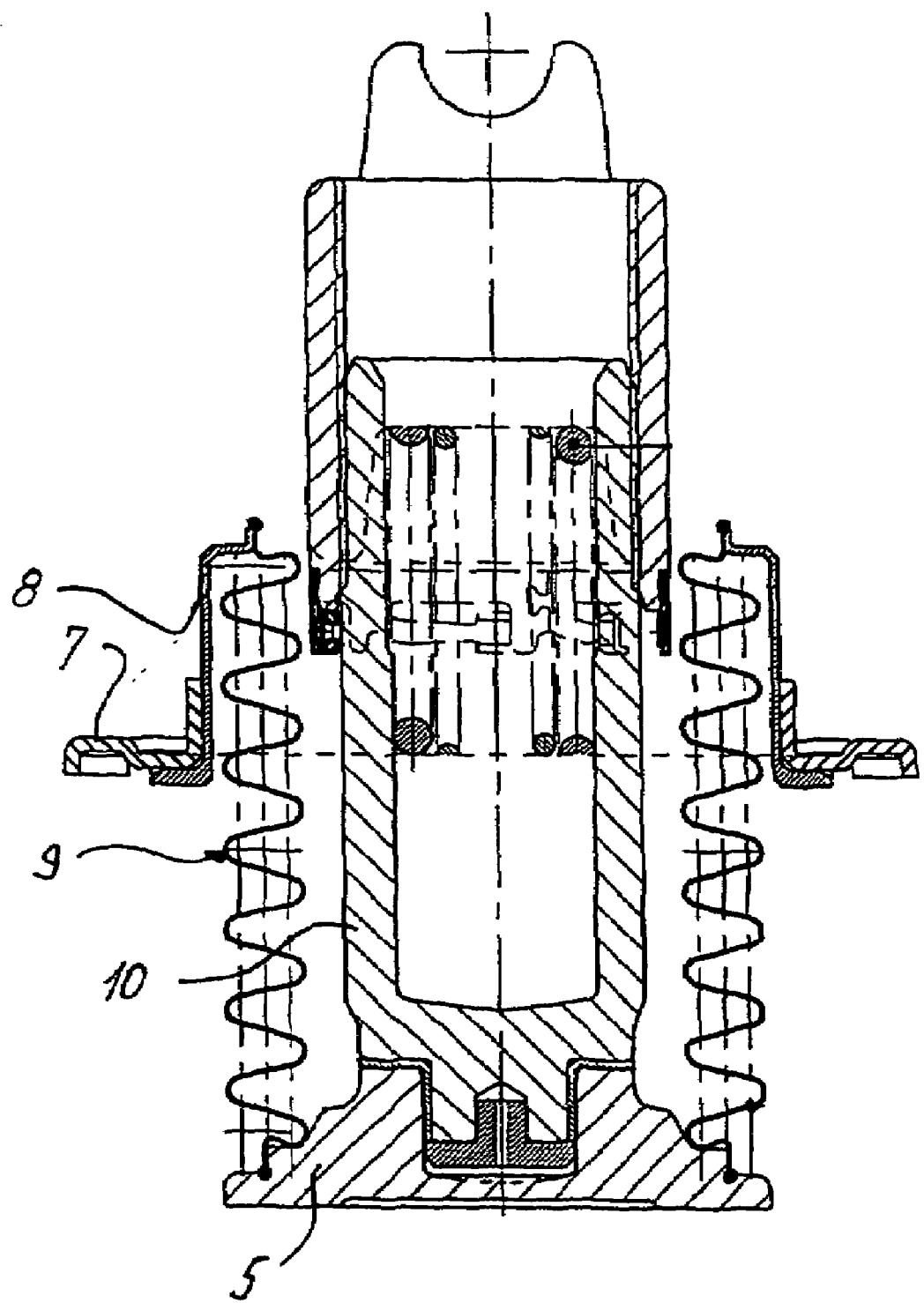
FIGS. 2 and 3 show, in each case, different exemplary embodiments of a component of the disc brake, which component is shown in longitudinal section in a detailed view.

As shown in FIG. 2, pots 8, which in each case extend into the interior of the brake caliper 1, are connected to the closure plate 7. The pots 8, in turn form a fastening element for in each case one bellows 9, which is connected on the other side to the associated pressure piece 5.

If at least one pressure piece 5 is likewise provided on the side which lies opposite the brake application device 2, the brake application device 6 may be sealed-off in each case with respect to the brake caliper 1 by a bellows 9 according to the invention made from a continuous metal sheet.

In the exemplary embodiment shown in accordance with FIGS. 1 and 2, the bellows 9, which surrounds the adjusting spindle 10 concentrically, is configured as a folding bellows in the form of a fluted bellows. The bellows 9 is composed of a thermally and/or mechanically highly loadable material, preferably metal.

Hermetic sealing both of the interior of the brake caliper 1 and also of the adjusting spindle 10 and of the associated brake application device 6 is ensured by the bellows 9.

As has already been mentioned, the folding bellows 9 is formed from a noncorroding metal, for example from a stainless steel, a lightweight metal, or the like. A metal sheet of continuous type is also contemplated.

Figure 3:
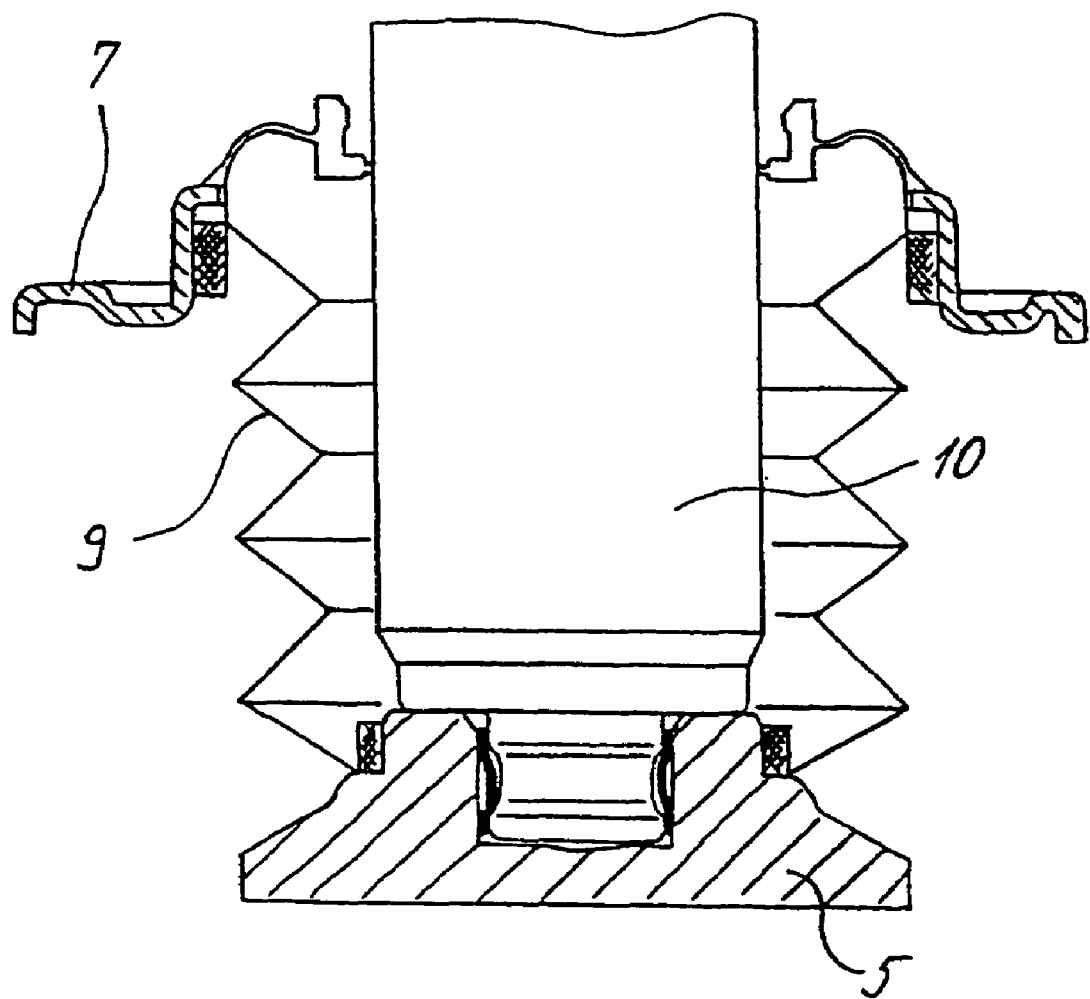

While the bellows 9 shown in FIG. 2 is configured as a fluted bellows, in the exemplary embodiment shown in FIG. 3, the bellows 9 is designed as a lamellar or diaphragm bellows.

FIGS. 4a to 4c show different ways of fastening the bellows 9 to the closure plate 7 or to the pot 8 (which is connected to the latter), for which an annular groove 23 has been made in a crossmember of the brake application device 6.

It can thus be seen in FIG. 4a that that edge of the bellows 9, which faces away from the pressure piece 5, is flangedly connected to the pot end. A groove 11, which is rolled in the flange region, provides a connection which can absorb high tensile and compressive forces.

It can be seen in FIG. 4b that the end of the bellows 9 is centered radially and is brazed to the edge of the pot 8. A stop 12 is provided at the outer edge of the pot 8 for the axial positioning of the bellows 9, which stop 12 extends radially inward and on which the correspondingly shaped end of the bellows 9 is supported.

Radial centering of the bellows end can likewise be seen in FIG. 4c. Here, too, the bellows 9 is axially secured on one side by the stop 12, while the fastening to the pot 8 is effected by a flange bushing 18, which is pushed onto the stop 12 and the correspondingly shaped edge of the bellows 9. The edge of the bellows 9 bears against the stop 12, and is subsequently flangedly connected.

The connection possibilities shown are not restricted to the use of a pot 8, but may also be carried out if the connection is carried out directly on the closure plate 7.

Finally, FIGS. 5a to 5c show different possible ways of connecting/coupling the bellows 9 to the pressure piece 5.

Thus, according to FIG. 5a, the connection is provided by that edge region of the bellows 9 which faces the pressure piece 5 bearing against the circumferential face of the pressure piece 5, which circumferential face has an approximately wedge-shaped circumferential web which serves as a die for a ring 14 which is pushed onto the edge region of the bellows 9 and subsequently produces a form-fitting connection by being pinched in accordance with the shape of the web 13.

In the example according to FIG. 5b, the pressure piece 5 has a concentric annular gap 15 on the side which faces the bellows 9, into which annular gap 15 the edge of the bellows 9 is inserted and connected to the pressure piece 5 by calking, soldering or other fastening types.

It can be seen in FIG. 5c that that edge of the bellows 9 which faces the pressure piece 5 is flangedly connected to a connecting plate 16. The connecting plate 16 is a constituent part of a thermal insulation 17, which is connected fixedly to the pressure piece 5 and which affords thermal protection of the appropriate components of the disc brake.

Although metal folding bellows are known per se, consideration up to now has not been given to the use of a metal folding bellows in commercial vehicle brakes, presumably since it was thought that the torque which the metal folding bellows 9 exerts in each case on the control spindles on account of its spring action stands in the way of its use, in particular as the spring action and thus the torque change continuously as the lining wear increases and the folding bellows 9 extends increasingly.

Figure 6A:
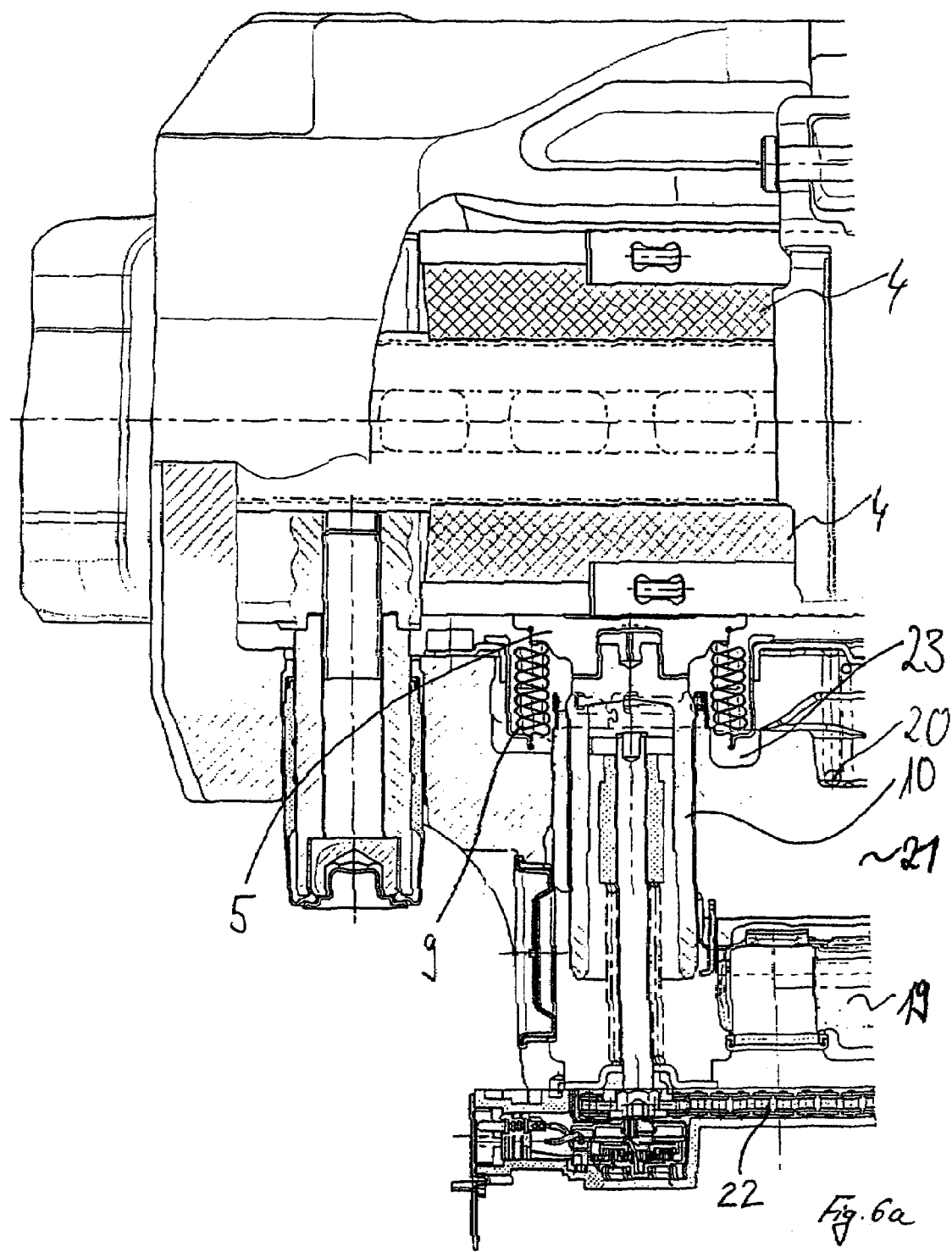
FIGS. 6a and 6b show enlargements of details of the disc brake from FIG. 1, in different operating states with unworn and worn linings.
Figure 6B:
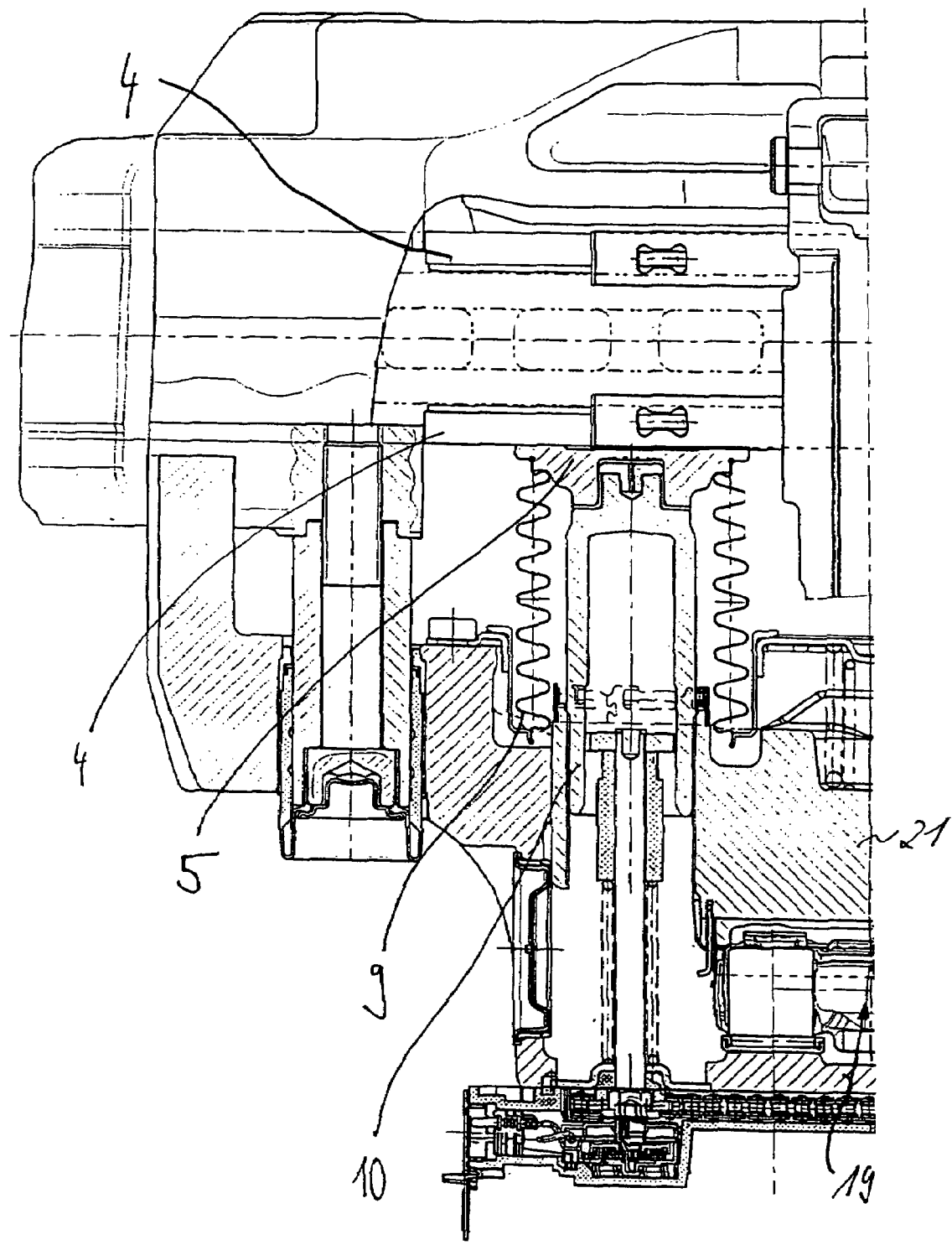
Figure 7A:
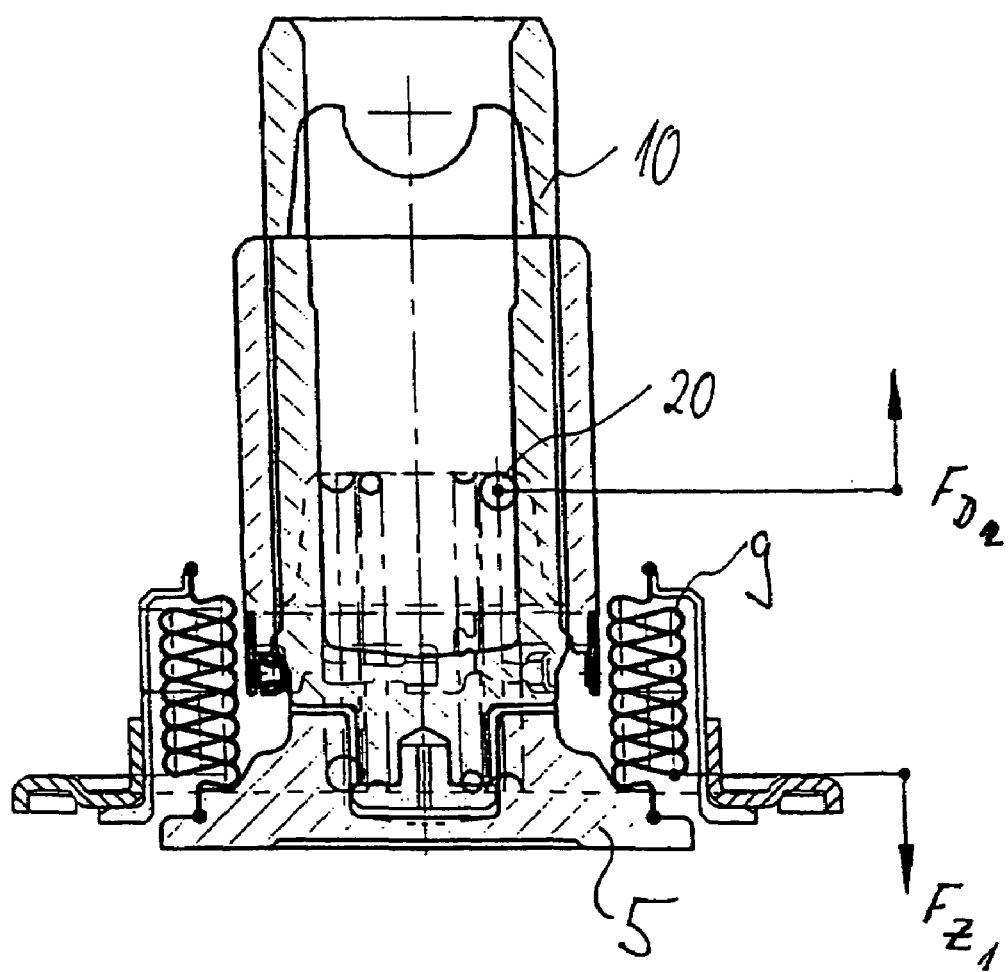
FIGS. 7a-7c show different operating states of the folding bellows with a different lining wear state.
Figure 7B:
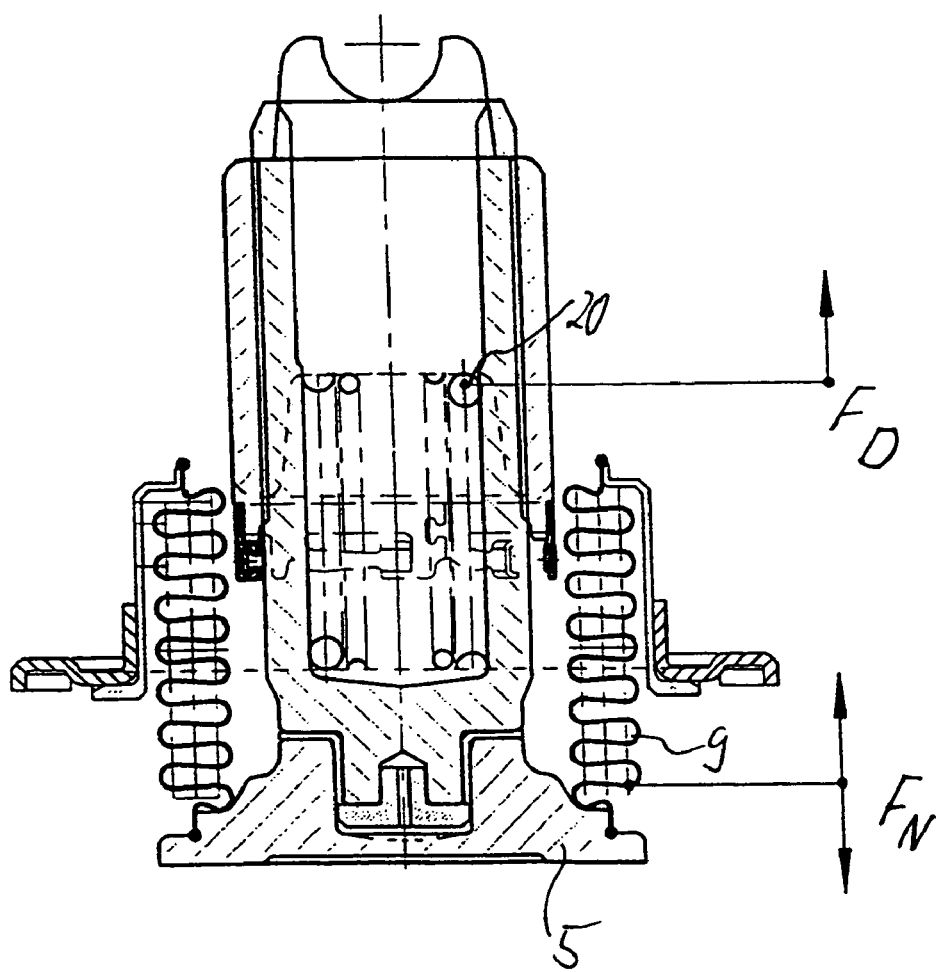
Figure 7C:
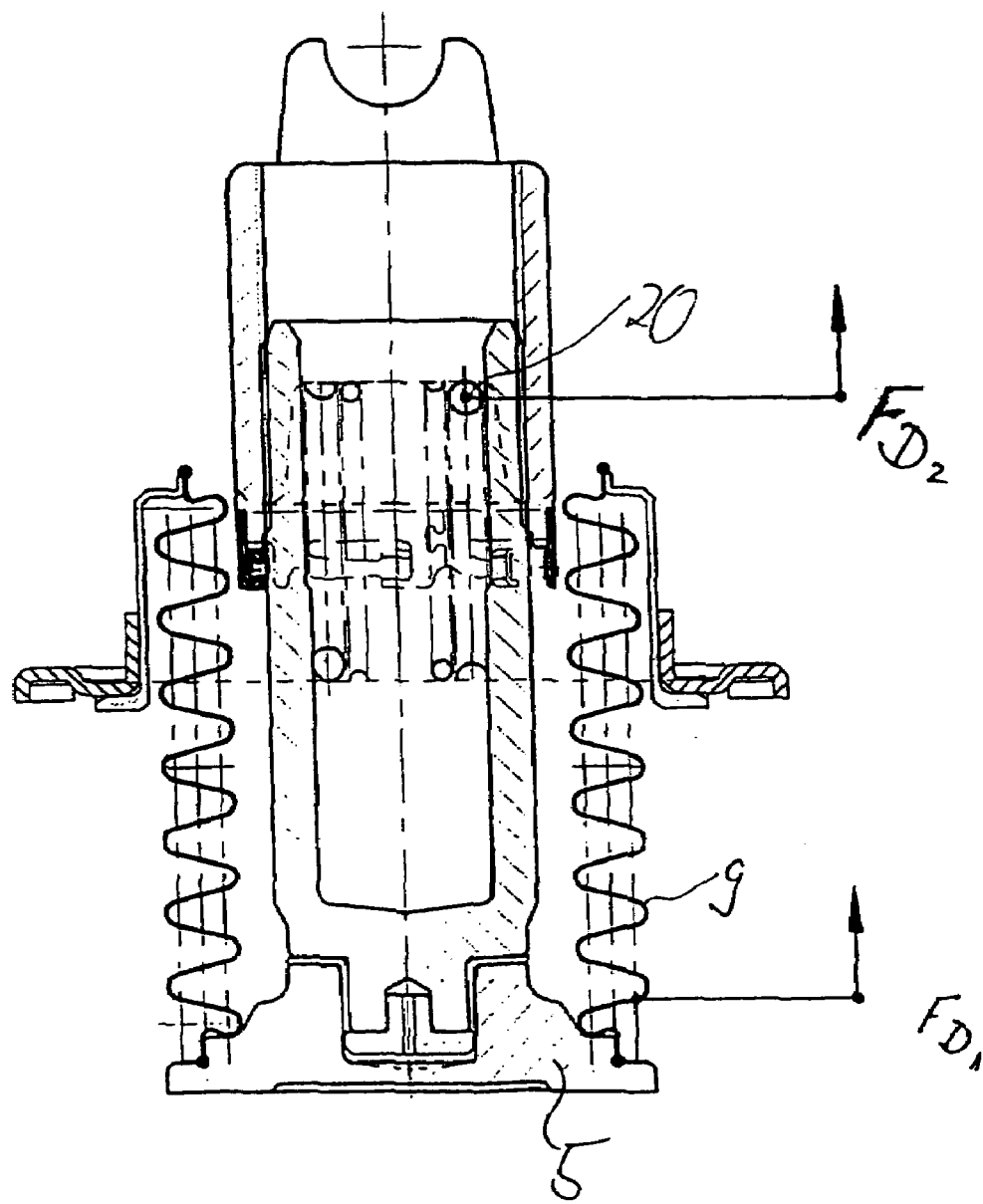

FIGS. 6 and 7 illustrate the effect in principle. FIG. 7a shows the state with unworn brake linings 4, in which state the folding bellows 9 acts as a compression spring between the brake caliper and the pressure pieces or on the pressure pieces, for example with an exemplary value $F_{z1}$ of approximately 350 N. At the end, in the event of completely worn brake linings 4, in contrast, it acts, as it were in the "completely extended state", as a tension spring between the brake caliper 1 and the pressure pieces 5, for example with an exemplary value $F_{D1}$ of approximately 210 N (FIG. 7c). It exerts no spring action somewhere in the middle between these positions, that is to say its effect is neutral ($F_N$=0 N; FIG. 7b). In addition, in each case $F_{D2}$ acts, for example, in each case with approximately 1000 N, that is to say the force of the bridge spring or bridge springs 20, that is to say their force and the forces of the two folding bellows are in each case added correspondingly. A design of this type does not impede the adjusting function of the brake to a practically considerable extent and protects the interior of the brake caliper, that is to say, in particular, the brake application device which is operated here by rotary lever, with eccentric rotary lever arrangement and crossmember (bridge) 21.

As an alternative, it is also contemplated to design the folding bellows as a pure tension spring throughout with regard to the pressure pieces, if the bellows is of correspondingly compressed construction.

| Table of Reference Numbers |
|---|
| 1 Brake caliper |
| 2 Brake application |
| 3 Brake disc |
| 4 Brake lining |
| 5 Pressure piece |
| 6 Wear adjusting device |
| 7 Closure plate |
| 8 Pot |
| 9 Bellows |
| 10 Adjusting spindle |
| 11 Groove |
| 12 Stop |
| 13 Web |
| 14 Ring |
| 15 Annular gap |
| 16 Connecting plate |
| 17 Insulation |
| 18 Flange bushing |
| 19 Rotary lever |
| 20 Bridge spring(s) |
| 21 Bridge or Cross member |
| 22 Chain |
| 23 Annular recess |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pneumatically or electromotively operable disc brake for a commercial vehicle, comprising:
a brake caliper which straddles a brake disc in use;
a brake application device arranged in the caliper, the brake application device displacing a pressure piece toward the brake disc in use;
an adjusting spindle arranged in the brake application device, wherein the pressure piece is coupled at one end of the adjusting spindle;
a wear adjusting device operatively coupled to the adjusting spindle for adjusting a clearance between the brake disc and a brake lining;
a deformable metal bellows operatively configured to seal the pressure piece with respect to the brake caliper; and
wherein the bellows is operatively configured to exert a thread holding moment on the adjusting spindle small enough that a wear adjusting function of the wear adjusting device remains effective to ensure rotation of the adjusting spindle.

2. The disc brake according to claim 1, wherein the bellows is composed of a noncorroding metal.

3. The disc brake according to claim 2, wherein the noncorroding metal is one of a stainless steel and a lightweight metal.

4. The disc brake according to claim 1, wherein the bellows comprises a continuous metal plate.

5. The disc brake according to claim 1, wherein the bellows is configured as a folding bellows.

6. The disc brake according to claim 5, wherein the folding bellows has one of a lamellar and fluted bellows construction.

7. The disc brake according to claim 5, wherein a spring force of the folding bellows is less than 1000 N in every operating state.

8. The disc brake according to claim 7, wherein the spring force is less than 800 N.

9. The disc brake according to claim 5, wherein the folding bellows is designed such that, in an event of unworn brake linings, the folding bellows acts as a compression spring and, in an event of worn brake linings, acts as a tension spring on the adjusting spindle.

10. The disc brake according to claim 5, wherein the folding bellows is designed such that, in an event of unworn brake linings and in an event of worn brake linings, the folding bellows acts as a tension spring on the adjusting spindle.

11. The disc brake according to claim 5, wherein the folding bellows is designed such that, in an event of unworn brake linings and in an event of worn brake linings, the folding bellows acts as a compression spring on the adjusting spindle.

12. The disc brake according to claim 1, wherein the bellows is connected with a material to material fit to at least one of the pressure piece and the brake caliper or parts attached to the brake caliper.

13. The disc brake according to claim 12, wherein the bellows is connected by one of welding, soldering, and brazing.

14. The disc brake according to claim 12, wherein the bellows is connected to at least one of the pressure piece and the brake caliper with a form-fitting and/or force-transmitting connection.

15. The disc brake according to claim 14, wherein the form-fitting and/or force-transmitting connection is produced by roll forming, pinching or pressing.

16. The disc brake according to claim 15, wherein for pressing, a ring is provided above an outer edge region of the bellows in the connecting region with the pressure piece or the brake caliper, which ring is pressed against a contour of the pressure piece or of the brake caliper, with inclusion of the edge region of the bellows.

17. The disc brake according to claim 12, wherein the bellows is connected to a connecting plate in the region of the pressure piece, which connecting plate is a constituent part of a thermal insulation which covers the pressure piece.

18. The disc brake according to claim 1, wherein the brake caliper is closed by a closure plate on its side which faces the brake disc, the closure plate having a pot assigned to every bellows, which pot encloses the bellows concentrically and over part of its length, the bellows being connected fixedly to the pot.

19. The disc brake according to claim 18, wherein an end of the pot which faces away from the pressure piece has a flanged portion which encloses the associated edge region of the bellows and into which a groove is pressed.

20. The disc brake according to claim 18, wherein an edge region of the bellows which faces away from the pressure piece bears against a stop of the pot in an axially secured manner.

21. The brake according to claim 18, wherein the pot is locked on the brake caliper or on a part which is connected to the brake caliper.

22. The disc brake according to claim 18, wherein the pot protrudes into an annular recess of a crossmember of the brake application device.

23. The disc brake according to claim 18, wherein the bellows is held by a flange bushing which is pushed onto the end of the pot which faces away from the pressure piece and is bent over while clamping in an edge of the bellows.

24. The disc brake according to claim 1, wherein, on a side which lies opposite the brake application device, the pressure piece is provided, which is sealed off with respect to the brake caliper by the bellows.

25. The disc brake according to claim 1, wherein, in an event of unworn brake linings, the bellows are at least partially rolled up into an initial position, such that, as lining wear increases, the bellows extends gradually out of the initial position.

26. The disc brake according to claim 1, wherein the bellows has at least one or more flutes or folds which ensure a spring action.

* * * * *